United States Patent
Agarwal et al.

(10) Patent No.: US 9,391,947 B1
(45) Date of Patent: Jul. 12, 2016

(54) AUTOMATIC DELIVERY CHANNEL DETERMINATION FOR NOTIFICATIONS

(71) Applicant: Google Inc., Mountain View, CA (US)

(72) Inventors: Ayush Agarwal, Mountain View, CA (US); Francis Ma, Mountain View, CA (US); Seth Sternberg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 14/173,779

(22) Filed: Feb. 5, 2014

Related U.S. Application Data

(60) Provisional application No. 61/911,972, filed on Dec. 4, 2013.

(51) Int. Cl.
| | | |
|---|---|---|
| *G06F 15/16* | (2006.01) | |
| *H04L 12/58* | (2006.01) | |
| *G06F 17/30* | (2006.01) | |
| *G06Q 50/00* | (2012.01) | |

(52) U.S. Cl.
CPC ........... *H04L 51/32* (2013.01); *G06F 17/3089* (2013.01); *G06Q 50/01* (2013.01); *H04L 12/588* (2013.01)

(58) Field of Classification Search
CPC .. G06Q 50/01; G06F 17/3089; H04L 12/588; H04L 51/32
USPC ................................................. 709/202–207
See application file for complete search history.

(56) References Cited

U.S. PATENT DOCUMENTS

| | | | | |
|---|---|---|---|---|
| 7,260,837 | B2 * | 8/2007 | Abraham | G06F 17/30867 709/203 |
| 8,631,119 | B2 * | 1/2014 | Malkin | H04L 51/32 709/203 |
| 8,676,937 | B2 * | 3/2014 | Rapaport | H04L 51/32 709/219 |
| 2009/0164559 | A1 * | 6/2009 | Johnson | H04L 12/1822 709/203 |
| 2011/0238815 | A1 * | 9/2011 | Malkin | H04L 12/588 709/224 |
| 2012/0158843 | A1 * | 6/2012 | Angani | G06Q 50/01 709/204 |
| 2013/0073636 | A1 * | 3/2013 | Zhu | H04L 51/043 709/206 |
| 2013/0184031 | A1 * | 7/2013 | Pollington | H04W 88/02 455/556.1 |
| 2015/0033305 | A1 * | 1/2015 | Shear | G06F 21/45 726/6 |
| 2016/0007912 | A1 * | 1/2016 | Hu | A61B 5/002 600/595 |

* cited by examiner

*Primary Examiner* — Bharat N Barot
(74) *Attorney, Agent, or Firm* — Patent Law Works LLP

(57) ABSTRACT

A system and method for delivering a message to one or more users from a sender disclosed. The channel application includes a habit engine, a context engine and a channel suggestion module. The habit engine determines habits of a user to identify when the user is available for interactions and categorizes user consumption of information as being a channel including push, queue or pull. The context engine determines a group of contexts for activities when the user is available for interactions. The channel suggestion module identifies a first context and a time of a message and provides the message to the user based on the time corresponding to the user's habits, the first context corresponding to one of the contexts in the group of contexts and the channel.

20 Claims, 9 Drawing Sheets

AUTOMATIC DELIVERY CHANNEL DETERMINATION FOR NOTIFICATIONS

CROSS REFERENCE TO RELATED APPLICATIONS

The present application claims priority, under 35 U.S.C. §119, of U.S. Provisional Patent Application No. 61/911,972, filed Dec. 4, 2013 and entitled "Automatic Delivery Channel Determination," which is incorporated by reference in its entirety.

BACKGROUND

The specification relates to delivering messages to users that are open to interactions. In particular, the specification relates to delivering messages via a channel based on a time and a context of the message.

Users of social networks can be notified in many different ways. For example, users can receive text messages, electronic messages, updates within the social network, etc. These notifications can easily become overwhelming, especially for users that are connected to more than a few other users. Current technology allows users to configure preferences to notify the user about certain types of updates. For example, a user can specify a preference for receiving an update when another user mentions the user in a post. However, these preferences are often too broad to be useful.

SUMMARY

In some embodiments, the specification describes a computer-implemented method comprising: determining habits of a user to identify when the use is available for interactions, determining a group of contexts for activities that the user performs when the user is available for interactions, categorizing user consumption of information as being a channel including push, queue or pull, identifying a first context and a time of a message, and providing the message to the user based on the time corresponding to the user's habits, the first context corresponding to one of the contexts in the group of contexts and the channel.

In some embodiments, the specification describes a system comprising one or more processors and a memory storing instructions that when executed by the one or more processors cause the system to: determine habits of a user to identify when the user is available for interactions, determine a group of contexts for activities the user performs when the user is available for interactions, categorize user consumption of information as being a channel including push, queue or pull, identifying a first context and a time of a message, and provide the message to the user based on the time corresponding to the user's habits, the first context corresponding to one of the contexts in the group of contexts and the channel.

In some embodiments, the operations further include receiving a search query from the user that includes search terms corresponding to the first context, generating search results including the message, and providing the search results including the message to the user. The operations further include determining which channels the user prefers to use, and wherein providing the message to the user is based on which channels the user prefers to use. The operations further include responsive to providing the message to the user, receiving feedback from the user that the user dislikes receiving notifications from one of the channels, and modifying settings based on the feedback.

In some embodiments, the features further include the push channel comprising notifications from an application that alerts a user device associated with the user, the queue channel comprising notifications from an application that creates a list of notifications for the user to review when the user accesses the application, the pull channel notifying the user about the message responsive to the user requesting information with the first context, the user being a first user, a second user is connected to the first user in a social network and the message including a request from the second user for the first user to join the second user in performing one of the activities, and the user being a first user, a second user is connected to the first user in a social network and the message including information about one of the activities performed by the second user.

The specification describes a channel application delivering messages from a sender to one or more recipients through a proper channel and at an appropriate time, which advantageously optimizes the interaction between the sender and the one or more recipients. The channel application determines a real time context associated with the recipient, an importance of the message to a context relating to the activity that the recipient finds interesting and delivers the message to the recipient through a channel and time that best matches the real time context of the recipient and the importance of the message.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

The specification describes a channel application for delivering a message to a user via a channel based on a time of delivery and a context of the message. The channel application determines habits of a user to identify when the user is available for interactions. For example, a user may take short breaks throughout the day or the user may spend three hours a night participating in social activities. The channel application determines a group of contexts for activities when the user is available for interactions. For example, the user participates in viewing of photographs, commenting on posts, gaming and participating in multi-user communication sessions about show dogs. The channel application combines the habits and group of contexts to determine when the user is available for interactions with a specific context. For example, the user may be interested in reading posts on a social network, but may be uninterested in gaming unless it is Saturday afternoon.

The channel application categorizes user consumption of information as being push, queue or pull. A push channel comprises notifications from an application that alert a user device associated with the user. For example, texts that buzz on a user's mobile device when the user receives a message are one type of notification received on a push channel. A queue channel comprises notifications from an application that creates a list of notifications for the user to review when the user accesses the application. For example, an email application can be considered a queue channel as long as receiving electronic mail does not cause a mobile device to chime when the electronic mail is delivered. A pull channel notifies the user about the message responsive to the user requesting information that corresponds to a message. For example, the user is generally uninterested in a friend's post about a steak restaurant unless the user is searching for information about steak restaurants.

The channel application identifies a first context and a time of a message. The channel application provides the message to the user based on the time corresponding to the user's habits, the first context corresponding to one of the contexts in the group of contexts and the channel. For example, when the user is in a time when he is open to interactions and wants to look at photos, the channel application sends the user text messages about new photos posted to the social network. In some embodiments, the channel application will also modify the deliver based on the user's preferences. For example, if the user generally finds the push channel to be annoying, the channel application transmits messages via the queue channel unless the notification is important, such as if the user is close to a bar where the user's friend just checked-in. In another example, the notification settings could be overridden for an exceptional situation, such as a health emergency notification from a medical application.

Figure 1:
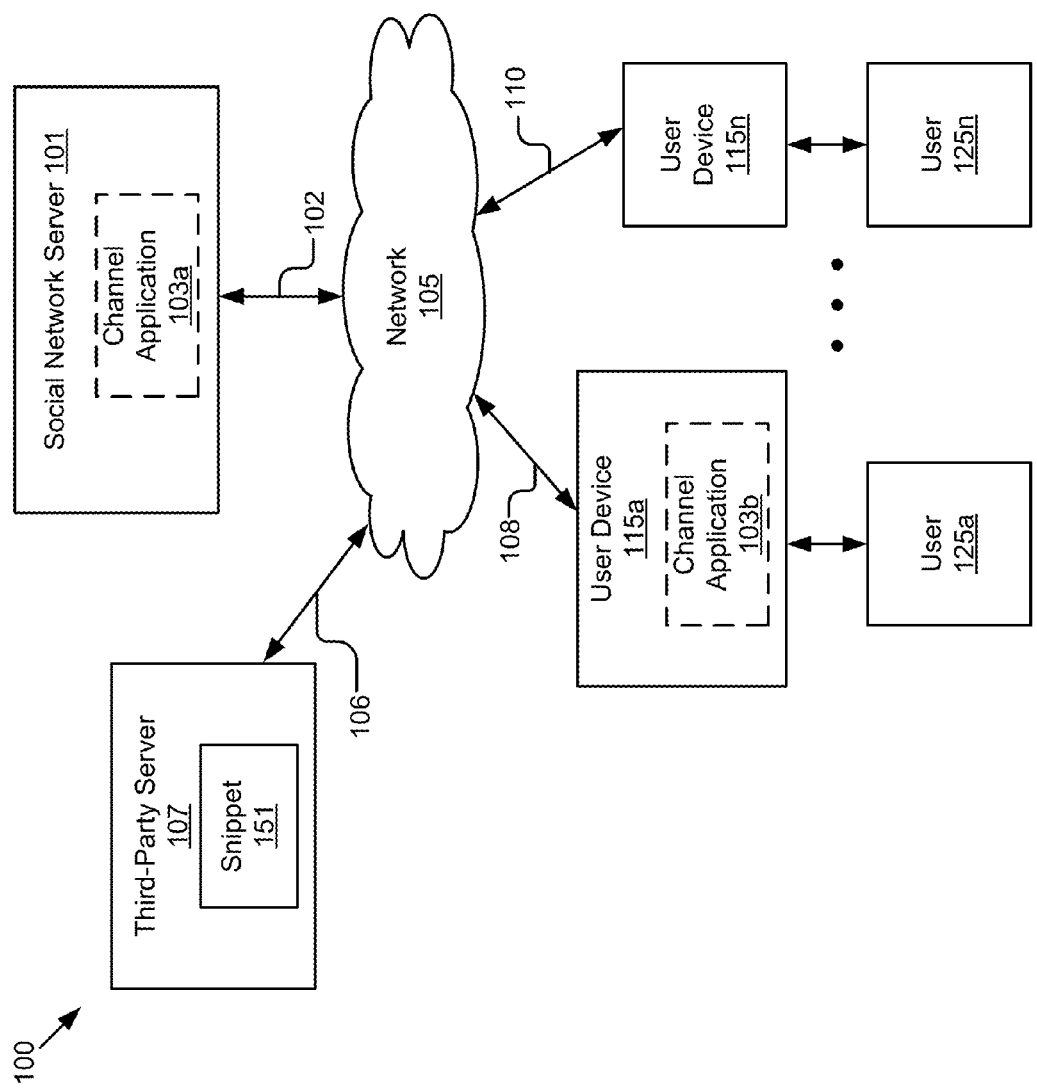
FIG. 1 is a block diagram illustrating an example of a system for delivering a message to one or more user recipients through multiple channels of communication.

FIG. 1 illustrates a block diagram of a system 100 for delivering a message to one or more user recipients through multiple channels of communication. The illustrated description of the system 100 includes user devices 115a . . . 115n that are accessed by users 125a . . . 125n, a social network server 101, and a third-party server 107. In the illustrated embodiment, these entities of the system 100 are communicatively coupled via a network 105. In FIG. 1 and the remaining figures, a letter after a reference number, for example "115a" is a reference to the element having that particular reference number. A reference number in the text without a following letter, for example "115," is a general reference to any or all instances of the element bearing that reference number.

The network 105 may be a conventional type network, wired or wireless, and may have any number of configurations for example a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or includes portions of a telecommunications network for sending data in a variety of different communication protocols. In some other embodiments, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, persons with ordinary skill in the art will recognize that any number of networks may be coupled to the above mentioned entities.

In some embodiments, a channel application 103a may be operable on the social network server 101, which is coupled to the network 105 via signal line 102. The social network server 101 can be a hardware server that includes a processor, a memory and network communication capabilities. The social network server 101 sends and receives data to and from one or more of the user devices 115a, 115n and the third-party server 107 via the network 105. The social network server 101 also includes a social network application (not pictured) that can be part of the channel application 103 or a standalone application. A social network can be any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph. In some examples, the social graph can reflect a mapping of these users and how they are related. Furthermore, it should be understood that the social network server 101 may be representative of one social network and that there may be multiple social networks coupled to the network 105, each having its own server, application and social graph. For example, a first social network may be more directed to business networking, a second may be more directed to or centered on academics, a third may be more directed to local business, a fourth is directed to dating and others are of general interest or a specific focus.

In some embodiments, a snippet 151 can be stored on a third-party server 107, which is communicatively connected to the network 105 via signal line 106. The third-party server 107 includes an application for generating a third-party website (not shown). The snippet 151 can be code or routines configured to enable the software included in the third-party server 107 to communicate with the channel application 103 so that the software can use the service provided by the channel application 103. For example, the snippet 151 communicates with the channel application 103 to generate a "send message" icon or button for sending messages to social connections within a social network and to incorporate it within the third-party website. The third-party website can be based on specific services, such as online multi-player games, fitness, calorie counting, reviews, traveling, etc. The users visiting the third-party website (or users authenticated through the social network server 101) can send messages to their connections (i.e. user recipients) within their respective social networks about at least one aspect of the service offered by the third-party website hosted by the third-party website. For example, an authenticated user sends messages, such as, invitations, turn-based notifications, challenge notification, etc. through a turn-based multiplayer game website to recipients on the social network with whom the sender is connected. In some embodiments, the snippet 151 includes HyperText Markup Language code ("HTML code") that can be configured to communicate with the channel application 103 to exchange data, information and/or commands. In some other embodiments, the snippet 151 includes code from a group of C, C++, Java, CSS and PHP. Furthermore, while only one snippet 151 is shown in the third-party server 107, the third-party server 107 could include one or more snippets 151. Similarly while only one third-party server 107 is shown, the system 100 can include one or more third-party servers 107.

The user devices 115a, 115n in FIG. 1 are used by way of example. Although only two user devices 115 are illustrated, persons of ordinary skill in the art will recognize that any numbers of user devices 115 are available to any number of users 125. The users 125a, 125n interact with the user devices 115a, 115n. In some embodiments, the channel application 103b may be stored on the user device 115a which is connected to the network 105 via signal line 108. In some other embodiments, the channel application 103 can be split into some components that are stored on the user device 115a and some components that are stored on the social network server 101. For example, the channel application 103a on the social network can store user information and receive messages and the channel application 103b on the user device 115a is a thin-client application for displaying the messages.

The user device 115 can be any computing device that includes a memory and a processor. For example, the user devices 115 can be a laptop computer, a desktop computer, a tablet computer, a mobile telephone, a personal digital assistant, a mobile email device, a portable game player, a portable music player, a television with one or more processors embedded therein or coupled thereto, a device that is worn by the user (e.g., a smart watch, part of a clip, or part of jewelry) or any other electronic device capable of accessing the network 105, etc.

The channel application 103 can be software including routines for delivering messages to one or more recipients from a sender. In some embodiments, the channel application 103 can be implemented using hardware including a field-programmable gate array (FPGA) or an application-specific integrated circuit (ASIC). In other embodiments, the channel application 103 can be implemented using a combination of hardware and software.

In some embodiments, the channel application 103 determines habits of a user to identify when the user is available for interactions and categorizes user consumption of information as being a channel including push, queue or pull. The channel application 103 determines a group of contexts for activities the user performs when the user is available for interactions. The channel application 103 identifies a first context and a time of a message and provides the message to the user based on the time corresponding to the user's habits, the first context corresponding to one of the contexts in the group of contexts and the channel. The channel application 103 is described in further detail below with reference to FIG. 2.

Figure 2:
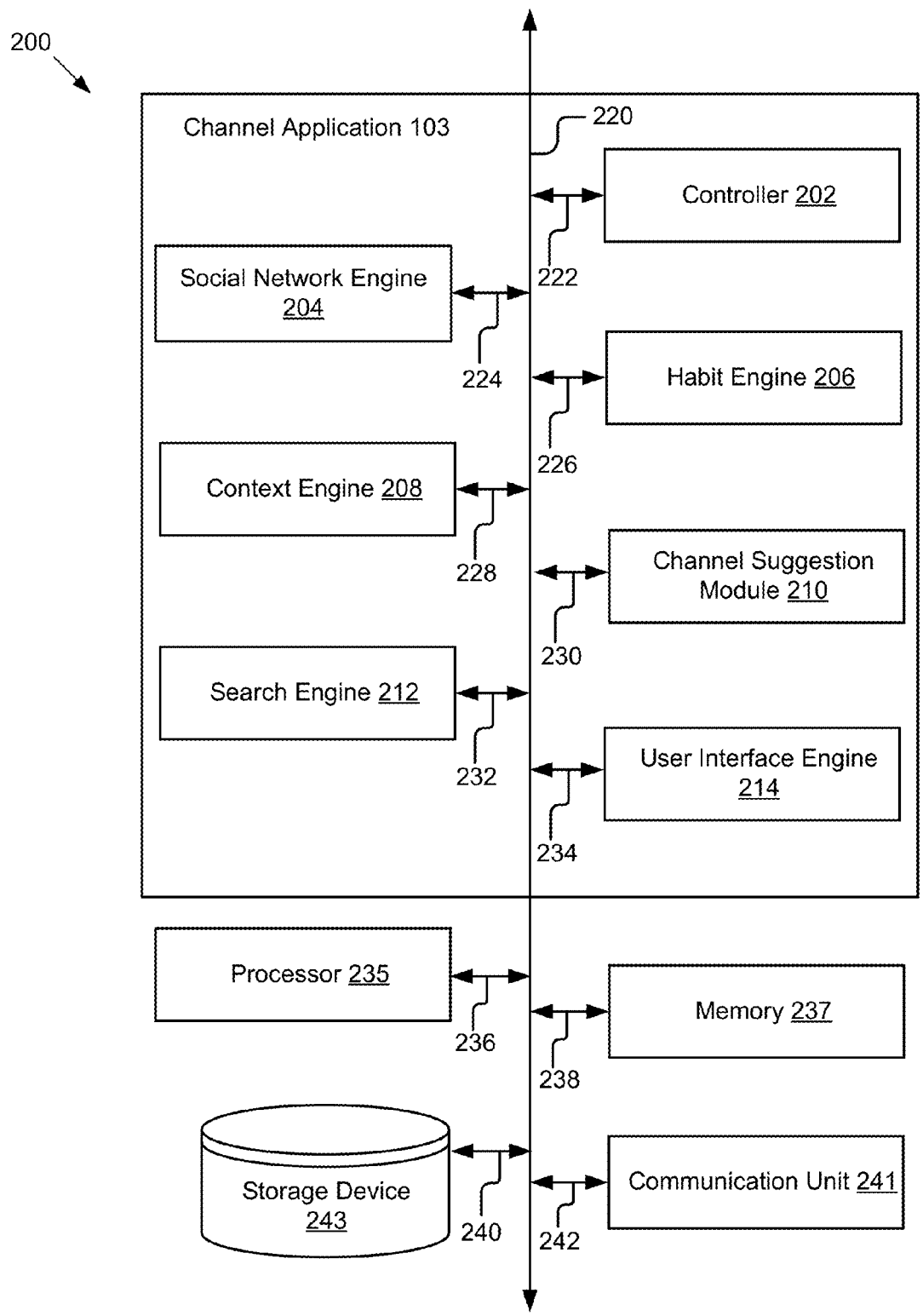
FIG. 2 is a block diagram illustrating an example channel application.

Referring now to FIG. 2, a block diagram of a computing device 200 is illustrated that includes a processor 235, a memory 237, a communication unit 241 and a storage device 243 according to some examples. The components of the computing device 200 are communicatively coupled by a bus 220. The computing device 200 can be a social network server 101 or a user device 115.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media for example a disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115 and the social network server 101 depending upon where the channel application 103 is stored. The communication unit 241 is coupled to the bus 220 via signal line 242. In some embodiments, the communication unit 241 includes a port for direct physical connection to the network 105 or to another communication channel. For example, the communication unit 241 includes a USB, SD, CAT-5 or similar port for wired communication with the user device 115. In some other embodiments, the communication unit 241 includes a wireless transceiver for exchanging data with the user device 115 or any other communication channel using one or more wireless communication methods, such as IEEE 802.11, IEEE 802.16, BLUE-TOOTH® or another suitable wireless communication method.

In some embodiments, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In some other embodiments, the communication unit 241 includes a wired port and a wireless transceiver. The communication unit 241 also provides other conventional connections to the network for distribution of files and/or media objects using standard network protocols such as TCP/IP, HTTP, HTTPS and SMTP as will be understood to those skilled in the art.

The storage device 243 can be a non-transitory memory that temporarily stores data used by the channel application 103, for example, a cache. The storage device 243 may be a dynamic random access memory (DRAM) device, a static random access memory (SRAM) device, flash memory or some other memory device known in the art. In some embodiments, the storage device 243 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated embodiment, the storage device 243 is communicatively coupled by the bus 220 for communication with the other components of the computing device 200 via signal line 240. Although only one storage device is shown in FIG. 2, multiple storage devices may be included. In another embodiment, the storage device 243 may not be included in the computing device 200 and can be communicatively coupled to the computing device 200 via the network 105.

In some embodiments, the storage device 243 stores the message sent by a sender to one or more user recipients on the social network. For example, the request can be a game invitation, a review, a status update, etc. In some embodiments, the storage device 243 stores data including daily habits, routines and activities determined for the one or more users on the social network. In some embodiments, the storage device 243 stores the data including groups of context and real time context associated with the one or more users. The data stored in the storage device 243 is described below in more detail. In some embodiments, the storage device 243 may store other data for providing the functionality described herein.

In some embodiments, the channel application 103 includes a controller 202, a social network engine 204, a habit engine 206, a context engine 208, a channel suggestion module 210, a search engine 212 and a user interface engine 214.

The controller 202 can be software including routines for receiving data via the communication unit 241, routing the data to the appropriate engine or module and transmitting responses from the engine or module to the communication unit 241 for transmission to the user device 115 or the social network server 101. In some embodiments, the controller 202 can be a set of instructions executable by the processor 235 to provide the functionality described below for handling communications between the channel application 103 and other components of the computing device 200. In some other embodiments, the controller 202 can be stored in the memory 237 of the computing device 200 and can be accessible and executable by the processor 235. In either of the embodiments, the controller 202 may be adapted for cooperation and communication with the processor 235 and other components of the computing device 200 via signal line 222.

In some embodiments, the controller 202 identifies the type of data being received and transmits the data to the appropriate engine or module of the channel application 103. For example, the controller 202 receives information from the social network server 101 for rendering a user interface of the social network and transmits the information to the user interface engine 214. In another example, the controller 202 receives information from the third-party server 107 for rendering a user interface of an online service (e.g., multi-player game website, review website, etc.) hosted by the third-party server 107 and transmits the information to the user interface engine 214. In some other embodiments, the controller 202 receives user inputs and user actions submitted by the user 125 from the user device 115. The controller 202 sends the user actions and the user inputs to the appropriate engine or module of the channel application 103. For example, the controller 202 receives a request query from the user device 115 and forwards the request query to the search engine 212.

In some embodiments, the controller 202 receives information from other components of the channel application 103 and transmits the information to the appropriate component in the system 100 via the communication unit 241. For example, the controller 202 receives graphical data for generating a user interface displaying a message from the user interface engine 214. The controller 202 transmits the graphical data associated with displaying the message to a display device (not shown) that is part of the user device 115. In another example, the controller 202 receives information including real time context data associated with a user recipient from the context engine 208. The controller 202 transmits the information including real time context data to the channel suggestion module 210 for determining a channel (e.g., text messaging, social network stream, etc.) to deliver the message to the user recipient.

In some embodiments, the controller 202 receives data from components of the channel application 103 and stores the data in the storage device 243. For example, the controller 202 receives data including groups of context and a real-time context associated with users from the context engine 208 and stores them in the storage device 243. In some other embodiments, the controller 202 retrieves data from the storage device 243 and sends the data to other components of the channel application 103. For example, the controller 202 retrieves one or more messages from the storage device 243 and transmits them to the channel suggestion module 210 for delivering the messages to the recipients.

The social network engine 204 can be software including routines for generating and managing a social network. In some embodiments, the social network engine 204 can a set of instructions executable by the processor 235 to provide the functionality described below for generating and managing a social network. In some other embodiments, the social network engine 204 can be stored in the memory 237 of the computing device 200 and can be accessible and executable by the processor 235. In either of the embodiments, the social network engine 204 can be adapted for cooperation and communication with the processor 235, the controller 202, the user interface engine 214 and other components of the channel application 103 via signal line 224.

A social network can be a type of social structure where the relationships between the users 125 are included in a social graph. In some embodiments, the social graph includes a social affinity between users. For example, when a first user follows a second user, they have a first-degree relationship. When the second user follows a third user that the first user does not follow, the first user has a second-degree relationship with the third user. The lower the degree of separation between users, the more they share social affinity. In some embodiments, social affinity is also a measure of how many people are connected between users. For example, two users that are associated with the same five people could have a higher social affinity than two users that are both associated with only one person.

The social network engine 204 manages the social network by handling registration of users, publication of content (e.g. posts, comments, photos, links, check-ins, etc.), hosting multi-user communication sessions, managing of groups, managing different sharing levels, updating the social graph, etc. The social network engine 204 registers a user by receiving information such as a username and password and generates a user profile that is associated with the user and stored as part of the social graph. In one embodiment, the user profile includes additional information about the user including interests (e.g. soccer, reading, food, subscriptions, gaming, etc.), activities (e.g. search history, indications of approval, posts, comments, multi-player online gaming, etc.), work (e.g., doctor, engineer, lawyer, research scientist, etc.), education (e.g., engineering, medicine, law, business, etc.) and demographics (e.g. age, ethnicity, location, etc.), etc. The social network engine 204 stores the user profile in the storage device 243.

In some embodiments users are connected in the social network by being friends. For example, users A and B can have reciprocal friendships with each other. In other embodiments, the relationships can be single directional, for example, when user A chooses to followed updates posted by user B. If user B chooses to follow user A, the relationship can be described as bi-directional or multi-directional. User B can choose to share updates with the public, which results in user A being able to view the update, or user B can share the updates with only people that user B follows. In some embodiments these relationships can be divided into groups on the social network based on context. Some areas of this disclosure refer to such groups as social groups. The groups can be used by the user to share information or send messages within the social network that is directed to that group. For example, user A can create an acquaintance group of users that user A wants to view updates from, but that user A does not know very well. In another example, user A can create a group of students taking the same class, e.g. a study group or people helpful for networking. In such examples, user A can use the created group to share information with or send messages directly to the members of the group.

In some embodiments, the social network engine 204 receives a request including login information for authentication. For example, the social network engine 204 receives a login request including a username and password from a user for logging into a social network. The social network engine 204 identifies the requesting user based on the login information associated with the login. In some other embodiments, the social network engine 204 communicates with the snippet 151 stored in the third-party server 107 and authenticates the user logging into the third-party website using the same credentials. For example, a user logs into a gaming website using the same user credentials used for logging into the social network. In some embodiments, the social network engine 204 receives Application Programming Interface (API) requests generated by the snippet 151 stored on the third-party server 107. The API requests retrieve information about the user (for e.g., profile photo and name) and connect the user with his or her social connections on the social network. In some other embodiments, the social network engine 204 receives a message from the snippet 151 on the third-party server 107. The message is sent to specific recipients on the social network from a sender logged into the third-party website. For example, a sender is connected to the specific recipients on the social network and sends an in-game message from a turn-based multiplayer website. The social network engine 204 transmits instructions to the user interface engine 214 to generate a user interface that includes information associated with the message including a picture or a thumbnail, a title and a body of the message.

In some embodiments, the social network engine 204 transmits messages received from a sender to the context engine 208. In some other embodiments, the social network engine 204 stores the messages in the storage device 243.

The habit engine 206 can be software including routines for identifying habits of one or more users of a social network. In some embodiments, the habit engine 206 can be a set of instructions executable by the processor 235 to provide the functionality described below for identifying habits of one or more users of a social network. In some other embodiments, the habit engine 206 can be stored in the memory 237 of the computing device 200 and can be accessible and executable by the processor 235. In either of the embodiments, the habit engine 206 can be adapted for cooperation and communication with the processor 235, the social network engine 204, the channel suggestion module 210 and other components of the channel application 103 via signal line 226.

In some embodiments, the habit engine 206 identifies habits of one or more users in day-to-day life. The one or more users can be recipients of a message (e.g., status update, restaurant review, multi-player game invitation, etc.) sent by a sender connected to the one or more users on the social network. In some embodiments, the habit engine 206 determines a time when and a location from where the user habitually checks to see new messages of the day. For example, the user habitually checks new messages in the electronic mail inbox towards the end of the day at 6 PM in his or her home. In another example, the user habitually logs into his or her social network profile to see new streams including messages after 9 PM in his or her home. In a different example, the user habitually checks new text messages received on the mobile device within a short window of time ranging from one minute to 30 minutes while at work.

In some embodiments, the habit engine 206 determines a habit of a user based on a client device 115 associated with the user. For example, the habit engine 206 determines that a user works between 9:00 am and 5:00 pm because the user is using a work computer during this time interval. The habit engine 206 also determines that the user enjoys leisure time at home after 6:30 pm since the user's home computer is on.

In some embodiments, the habit engine 206 determines a habit of a user based on determining a location of a client device 115 associated with the user. The habit engine 206 determines a location of a client device 115 based on an internet protocol (IP) address associated with the client device, triangulation of signals from the client device 115, a global positioning system (GPS) installed on the client device 115, or an application used in the client device 115. For example, the habit engine 206 identifies that a user is working during 8:00 am-5:00 pm because an IP address of a computer associated with the user belongs to a company, triangulating signals or GPS signals from a tablet associated with the user indicate that the user is in a work place, or a cookie from a web browser on a computer associated with the user shows that the user is at work. In some other embodiments, the habit engine 206 determines a habit of a user based on a location history of a client device 115 associated with the user. For example, at the first time, the habit engine 206 receives a user login request from a computer, identifies an IP address associated with the login request, compares the IP address with a list of IP addresses, determines that the IP address was assigned to a company, and determines that the computer is a work computer. Later, when the habit engine 206 receives the same IP address, the habit engine 206 identifies that this IP address is associated with a work computer based on the location history and determines that the user is working.

In some embodiments, the habit engine 206 determines daily activities of the one or more users based on a combination of location and user device 115 activities. For example, the habit engine 206 determines that the user works habitually every weekday between 9 and 5 PM based on the IP address associated with the user device 115 and the online browsing activity on the user device 115 indicating predominantly business related browsing. In another example, the habit engine 206 determines that the user habitually waits at a subway station between 5 PM and 5:30 PM based on the GPS coordinates associated with the user device 115. In a different example, the user is at home after 7 PM based on the internet protocol address of the user device 115 and online browsing activity indicating leisurely browsing of social networks, micro-blogs, discussion forums, etc.

In some embodiments, the habit engine 206 monitors consumption of information associated with the one or more users on the user device 115. The habit engine 206 categorizes the user consumption of information as being on one or more channels. The one or more channels can include: (a) push or interrupt channel, (b) queue channel, and (c) pull channel. An example of a push or interrupt channel of information consumption is text messaging on the mobile device and obtaining information through text messaging. An example of a queue channel of information consumption is electronic mail and obtaining information through electronic mail. Another example of a queue channel of user consumption is profile stream on a social network and obtaining information through the profile stream. An example of a pull channel of information consumption is through a search results page when the user seeks out a particular piece of information by searching for it.

In some embodiments, the habit engine 206 determines a channel that the one or more users most commonly prefer for obtaining information. For example, the habit engine 206 determines that a first user is responsive to a push channel of information exchange and so the first user's preference is for text messaging. In another example, the habit engine 206 determines that a second user is not responsive, preferring to use the queue channel of information exchange and so the second user's preference is for electronic mail or a profile stream on a social network. In a third example, the habit engine 206 determines that a third user is passive, preferring to pull information when needed and so the third user's preference is through search results page.

In some embodiments, the habit engine 206 transmits the data including determined habits and activities of the one or more users to the channel suggestion module 210. In some other embodiments, the habit engine 206 stores the data including habits and activities in the storage device 243.

The context engine 208 can be software including routines for determining context for activities performed by users when the one or more users are available for interactions. In some embodiments, the context engine 208 can be a set of instructions executable by the processor 235 to provide the functionality described below for determining context for activities of the one or more users. In some other embodiments, the context engine 208 can be stored in the memory 237 of the computing device 200 and can be accessible and executable by the processor 235. In either of the embodiments, the context engine 208 can be adapted for cooperation and communication with the processor 235, the social network engine 204, the channel suggestion module 210 and other components of the channel application 103 via signal line 228.

In some embodiments, the context engine 208 receives data including daily habits and activities associated with a user and determines a group of contexts relating to activities that the user finds interesting. The context engine 208 therefore determines the user's appetite to engage during the available time periods. The user engages in interactions with his or her connections on the social network while participating in the activities that interest him or her. For example, a first context relating to an activity that interests the user is eating or trying a certain type of dish, such as steak, sushi, etc. In another example, a second context relating to an activity that interests the user is participating in extreme sports, such as sky diving, skiing, mountain biking, etc. In yet another example, a third context relating to an activity that the user enjoys is gaming on the social network, such as, turn-based multiplayer online games, etc. Examples of other contexts could include, playing contact sports, watching movies, discussing books, tracking trends in fashion, learning new fitness routines, etc.

In some embodiments, the context engine 208 ranks the group of contexts relating to the activities that a user finds interesting. The group of contexts is ranked based on how important the context relates to the activities and how much they matter to the user. For example, the context engine 208 determines a group of contexts relating to the activities that the user engages in, such as, playing soccer, watching action movies, eating sushi, practicing yoga, and reading autobiographies. The context engine 208 ranks the group of contexts based on the number of times the user performed an activity relating to the context. For example, the context engine 208 ranks sushi as the highest context because the user checked-in at a sushi restaurant, posted an article about sushi, approved of a picture of another user's sushi, and purchased a sushi making kit. Conversely, the context engine 208 ranked yoga as the lowest context in the group of contexts because the user only performed one activity relating to the context.

In some embodiments, the context engine 208 determines a real-time context associated with the one or more users that receive a message from a sender on the social network. For example, the context engine 208 determines that a first user is currently driving in Cupertino, a second user is currently at work researching a work related topic online, a third user is currently waiting at a subway metro reading news article online, a fourth user is currently at home posting comments on a social network, a fifth user is currently searching online for a steak house to have dinner at, etc.

In some embodiments, the context engine 208 transmits the data including groups of context relating to activities determined for a user to the channel suggestion module 210. In some other embodiments, the context engine 208 transmits the data including real time context associated with the user to the channel suggestion module 210. In yet other embodiments, the context engine 208 stores the data including groups of context and real-time context associated with the users in the storage device 243.

The channel suggestion module 210 can be software including routines for determining a channel for forwarding a message to the one or more users from a sender. In some embodiments, the channel suggestion module 210 can be a set of instructions executable by the processor 235 to provide the functionality described below for forwarding a message to the one or more users from a sender. In some other embodiments, the channel suggestion module 210 can be stored in the memory 237 of the computing device 200 and can be accessible and executable by the processor 235. In either of the embodiments, the channel suggestion module 210 can be adapted for cooperation and communication with the processor 235, the social network engine 204, habit engine 206, the context engine 208 and other components of the channel application 103 via signal line 230.

In some embodiments, the channel suggestion module 210 receives daily habits and activities associated with the each one of the users (recipients of a message from a sender) from the habit engine 206. The channel suggestion module 210 receives a group of contexts relating to activities for each one of the users from the context engine 208. In some other embodiments, the channel suggestion module 210 receives a real-time context associated with each one of the users from the context engine 208.

In some embodiments, the channel suggestion module 210 receives a message (sent by a sender) from the social network engine 204. In some embodiments, the channel suggestion module 210 identifies a context and a time associated with the message. For example, a sender sends a message from a turn-based multi-player online game to one or more users on the social network and challenges them to counter his or her move in the online game. The channel suggestion module 210 identifies a context relating to playing online games with friends. In another example, the sender sends a message reviewing a mountain bike to one or more users on the social network. The channel suggestion module 210 identifies a context relating to liking and using mountain bikes. In yet another example, the sender sends a message indicating number of calories spent exercising during a particular gym routine. The channel suggestion module 210 identifies a context relating to working out and fitness regime.

In some embodiments, the channel suggestion module 210 determines whether the context of the message matches one from the group of contexts relating to activities that a user finds interesting. For example, the channel suggestion module 210 determines that a message about a game challenge matches a context relating to playing online games associated with the user. In another example, if the message is a review of a steakhouse and it matches a context relating to liking steaks associated with the user. In yet another example, if the message is a video of skydiving and it matches a context relating to liking extreme sports associated with the user.

In some embodiments, the channel suggestion module 210 determines an appropriate channel and time to deliver the message individually to each one of the users from the sender. The channel suggestion module 210 determines an appropriate channel and time based on matching the context of the message with a group of contexts and a real-time context associated with each one of the users. For example, a first user lives in San Francisco. The first user is associated with a second user in the social network (e.g. they are friends, the first user placed the second user in a group, they belong to the same community, etc.). The second user lives in Denver, but he generates a message about how he is in San Francisco for the day. The channel suggestion module 210 selects a push channel for delivering the message because the message has a time-sensitive nature.

In another example, the message is a review of a steak house in Palo Alto posted by the sender at 1 PM. For a first user, the channel suggestion module 210 identifies that the review of the steak house matches a context relating to liking steaks associated with the first user and that the real-time context of the first user is that he or she is in Cupertino. The channel suggestion module 210 delivers the review through text messaging (i.e., push channel) to the first user. The text message is delivered to the first user right after the sender posts the review because the first user is currently within proximity to the steak restaurant.

For a second user, the channel suggestion module 210 identifies that the review matches a context relating to liking steaks for the second user. The real-time context of the second user indicates that the second user is currently at work. As a result, the channel suggestion module 210 delivers the review through electronic mail (i.e., the queue channel) to the second user. The electronic mail is sent right after the sender posts the review or the electronic mail is sent when the second user habitually checks the inbox of the electronic mail at 7 PM. In another example, the channel suggestion module 210 delivers the review to the second user through the profile stream (i.e., the queue channel) on the social network when the second user habitually checks to see the profile stream.

For a third user, the channel suggestion module 210 identifies that the review does not match any context in the group of contexts associated with the third user because he or she is a vegetarian. In such a case, the channel suggestion module 210 uses a pull channel and provides the review to the search engine 212 (i.e., the pull channel) so as to make it available to the third user when he or she does an online search for steak houses in the future.

In some embodiments, the channel suggestion module 210 determines how important the message is for each one of the users who are recipients of the message from the sender. The channel suggestion module 210 determines an appropriate channel and time to deliver the message based on the importance of the message. For example, consider the message as a game invitation on a multi-player online game sent on the social network. For a first user, the channel suggestion module 210 receives the high ranking of the context of the game invitation in the group of contexts (because the first user is an active gamer) relating to the activities that the first user finds interesting. The channel suggestion module 210 delivers the game invitation through text messaging (i.e., the push channel) to the first user. The text message is delivered to the first user right after the game invitation is issued by the sender. For a second user, the channel suggestion module 210 determines that the context of the game invitation is present on the group of contexts relating to the activities that the second user finds interesting but not as high as on the first user's group of contexts (because the second user is a moderately active gamer). The channel suggestion module 210 delivers the game invitation through electronic mail (i.e., the queue channel) to the second user. In one example, the channel suggestion module 210 delivers the game invitation through the profile stream notification on the social network of the second user. For a third user, the channel suggestion module 210 determines that the context of the game invitation does not match the group of contexts (because the third user is an inactive gamer) relating to the activities that the third user finds interesting. The channel suggestion module 210 sends the invitation to the search engine 212 (i.e., pull channel) so as to make it available to the third user when he or she does an online search for multi-player games in the future.

In some embodiments, the channel suggestion module 210 identifies a channel that each one of the users receiving the message prefer from the data sent by the habit engine 206. The channel suggestion module 210 determines a channel for delivering the message based on the channel preference associated with each one of the users. For example, a first user is responsive to text messaging and prefers the push channel of information exchange, so the channel suggestion module 210 delivers the message from the sender through text messaging. In another example, a second user is not responsive, dislikes the push channel method of information exchange and rather prefers to receive message from the sender through the queue channel of information exchange, so the channel suggestion module 210 delivers the message through electronic mail or a profile stream of the second user on the social network. In yet another example, a third user is passive and rather prefers to pull the message when needed through the pull channel method of information exchange, so the channel suggestion module 210 delivers the message through the search results page when the third user enters search terms relating to a context of the message sent by the sender. Because the pull method relies on the user entering search terms into a search engine that are similar to the message content, in some embodiments, the channel suggestion module 210 can aggregate the messages that are relegated to the pull channel and notify the user of the messages via the push or queue channels. For example, where the messages for the pull channel exceed a threshold (e.g. 20 messages), the channel suggestion module 210 sends the user an email with a list of the messages.

In some embodiments, the channel suggestion module 210 stores the message intended for the recipients in the storage device 243. In some other embodiments, the channels suggestion module 210 sends the message to the user interface engine 214 to generate a user interface for displaying the message and to the search engine 212 to deliver the message to users through pull channel of information exchange.

The search engine 212 can be software including routines for retrieving information based on a query input by a user. In some embodiments, the search engine 212 can be a set of instructions executable by the processor 235 to provide the functionality described below for retrieving information. In some other embodiments, the search engine 212 can be stored in the memory 237 of the computing device 200 and can be accessible and executable by the processor 235. In either of the embodiments, the search engine 212 can be adapted for cooperation and communication with the processor 235, the channel suggestion module 210 and other components of the computing device 200 via signal line 232. Persons of ordinary skill in the art will recognize that the search engine 212 can be stored on a separate server from the social network server 101, for example, a server that is dedicated to performing tasks for the search engine.

In some embodiments, the search engine 212 searches for information on World Wide Web and file transfer protocol (FTP) servers that correspond to a keyword identified in a query submitted by the user. In some embodiments, the search engine 212 searches queries submitted as audio or as an image query. For example, the user speaks into a microphone on the user device 115 and the audio is submitted to the search engine 212, which includes a speech-to-text algorithm for converting the audio to text. The retrieved information is generally presented as a list of best matching results on a search engine results page corresponding to at least one identified keyword in the query and includes web pages, images, maps, video and audio links.

In some embodiments, the search engine 212 receives a message intended for delivery to a user from the channel suggestion module 210. The search engine 212 delivers the message responsive to the user searching for results relating to a context of the message sent by the sender. For example, when the user inputs a search query for multi-player online games, the search engine 212 retrieves a page of results including the game invitation message from a sender inviting the user to play a specific multi-player game. In another example, when the user who is a vegetarian searches for a steak house to plan a dinner party, the search engine retrieves a page of results including a review of a steak house in Palo Alto that the sender shared with the user.

The user interface engine 214 can be software including routines for generating graphical data for providing user interfaces to users. In some embodiments, the user interface engine 214 can be a set of instructions executable by the processor 235 to provide the functionality described below for generating graphical data for providing user interfaces that includes messages from a sender. In some other embodiments, the user interface engine 214 can be stored in the memory 237 of the computing device 200 and is accessible and executable by the processor 235. In either of the embodiments, the user interface engine 214 can be adapted for cooperation and communication with the processor 235 and other components of the channel application 103 via signal line 234.

In some embodiments, the user interface engine 214 receives instructions from the social network engine 204 to generate graphical data that depicts a user interface for displaying a message from a sender. The message includes a picture or a thumbnail, a title and a body of the message. In some other embodiments, the user interface engine 214 generates graphical data for social network content based at least in part on instructions from the social network engine 204.

For example, the user interface engine 214 generates graphical data for displaying a user profile photo, name, text messages, videos, etc. The user interface engine 214 sends the graphical data to an application (e.g., a browser) in the user device 115 via the communication unit 241 causing the application to display the data in a user interface. The communication unit 241 transmits the message using the channel determined by the channel suggestion module 210.

Figure 3:
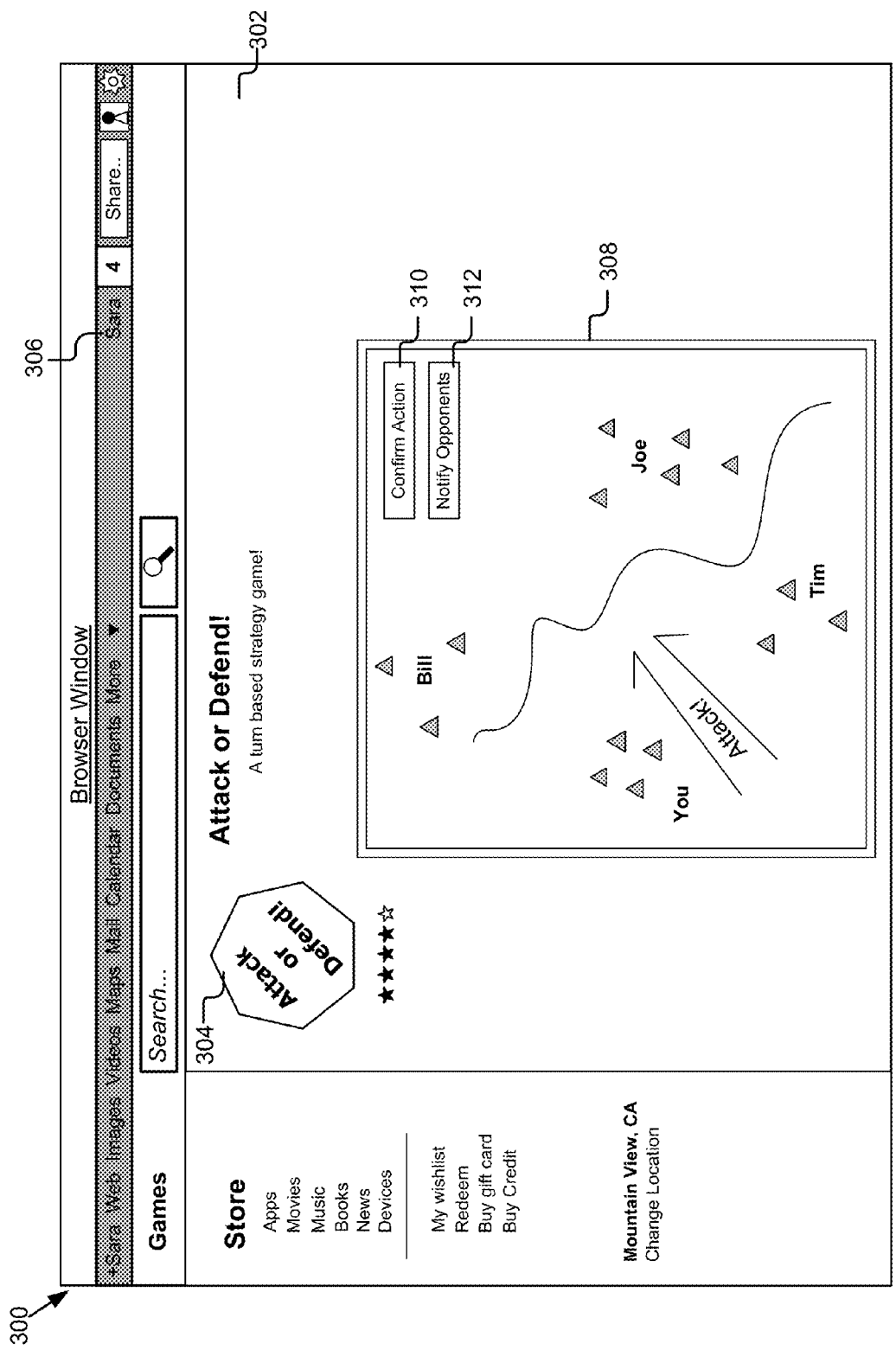
FIG. 3 is an example graphic representation of a user interface for sending a message from a sender to one or more user recipients on a social network.

Turning now to FIG. 3, one example of a graphical representation of a user interface 300 for sending a message from a sender to one or more user recipients on a social network is illustrated. The user interface 300 displays a web page 302 for a game 304 played by the user "Sara" 306. The user "Sara" 306 is authenticated using the login credentials for the social network in order to play the game 304. The game 304 is a turn-based multi-player game and the graphics of the game is displayed inside the game window 308. The user "Sara" 306 chooses an action from either one of the "Attack" or "Defend" and confirms the action by clicking on the button "Confirm Action" button 310. The user "Sara" 306 can send a message to her friends "Bill," "Joe," and "Tim" notifying them that she played her turn in the game 304. The user "Sara" 306 sends them the message by clicking on the button "Notify Opponents" button 312. In some embodiments, the user "Sara" 306 can send a custom message to her friends on the social network relating to the game 304. In some other embodiments, the user "Sara" 306 can send an invitation to a friend to join the game 304.

Figure 4:
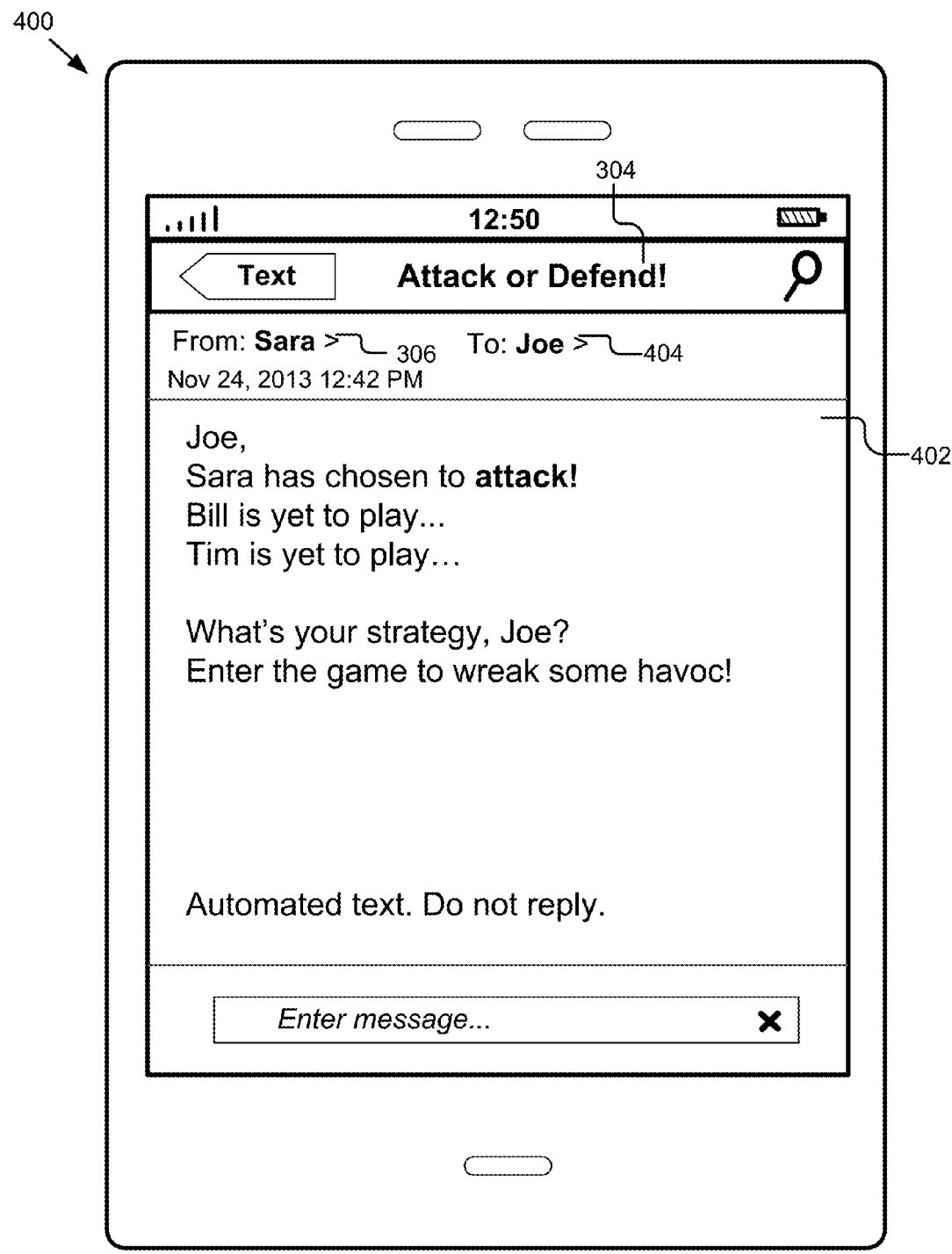
FIG. 4 is an example graphic representation of a user interface where a message from a sender is received through text messaging.

FIG. 4 is an example of a graphic representation of a user interface 400 where a message from a sender is received through text messaging. The user interface 400 displays a text message 402 including a title 304, the name of the user "Sara" 306 who sent the message to the user "Joe" 404 and a time the text message was sent. The text message 402 indicates that the user "Sara" 306 has used her turn to make a move in the online game 304 and that the other users "Bill" and "Tim" have yet to play. In one example, the user "Joe" 404 prefers the push channel when the message relates to a context of playing online games and so has received the message through text messaging right after the sender "Sara" 306 sent the message.

Figure 5:
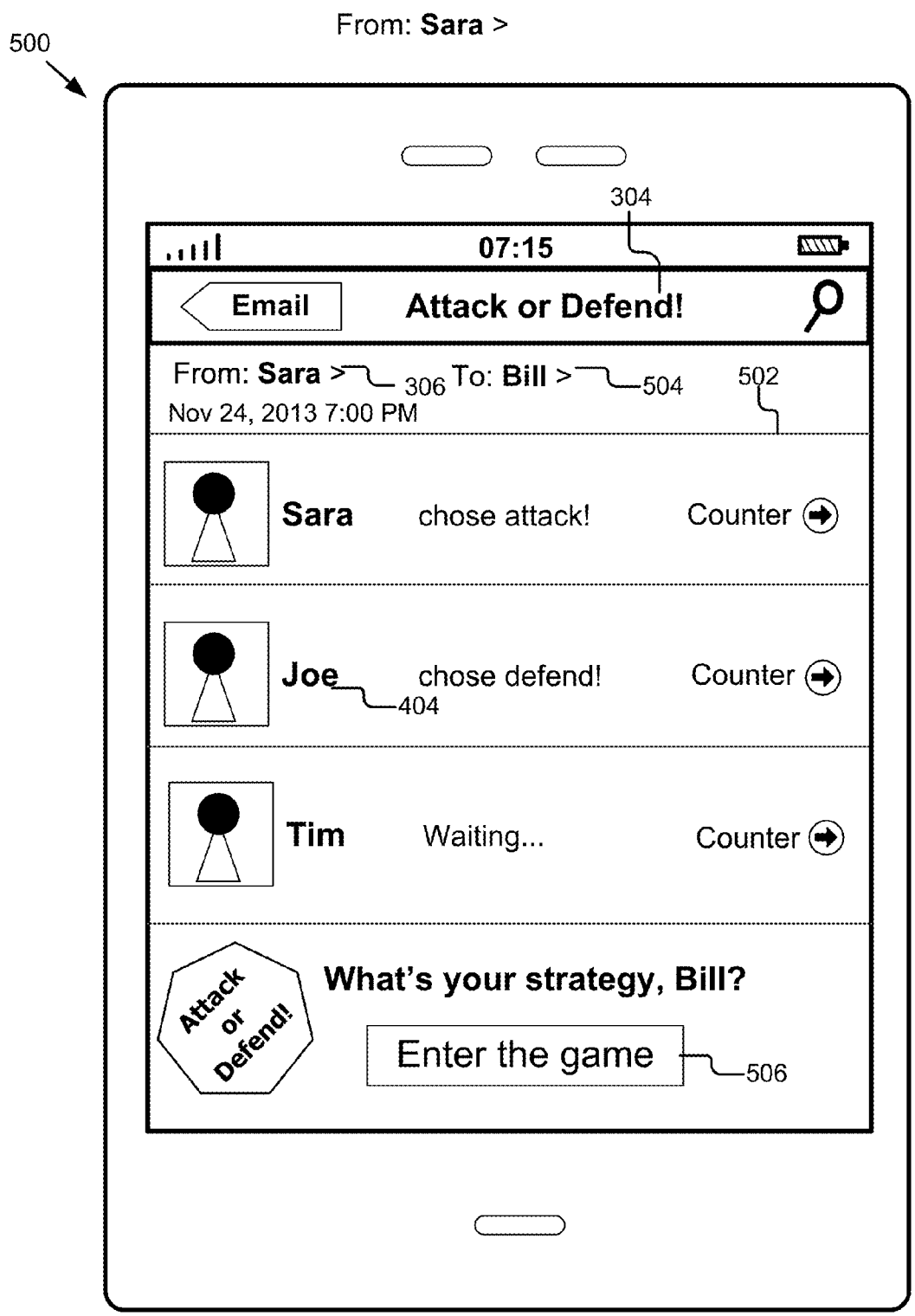
FIG. 5 is an example graphic representation of a user interface where a message from a sender is received through electronic mail.

FIG. 5 is an example of a graphic representation of a user interface 500 where a message from a sender is received through electronic mail. The user interface 500 displays an electronic mail 502 received by the user "Bill" 504 from the user "Sara" 306. The electronic mail 502 is an example of sending a message to a user through a queue channel. In one example, the user "Bill" 504 receives the message in the electronic mail 502 format because the real-time context associated with the user "Bill" 504 indicated that he was at work when the user "Sara" 306 sent the message. The electronic mail 502 indicates that the user "Sara" 306 and the user "Joe" 404 have made their move but are waiting for user "Tim." The electronic mail 502 includes a button "Enter the game" 506 which the user "Bill" 504 can click to enter the game and play his turn.

Figure 6:
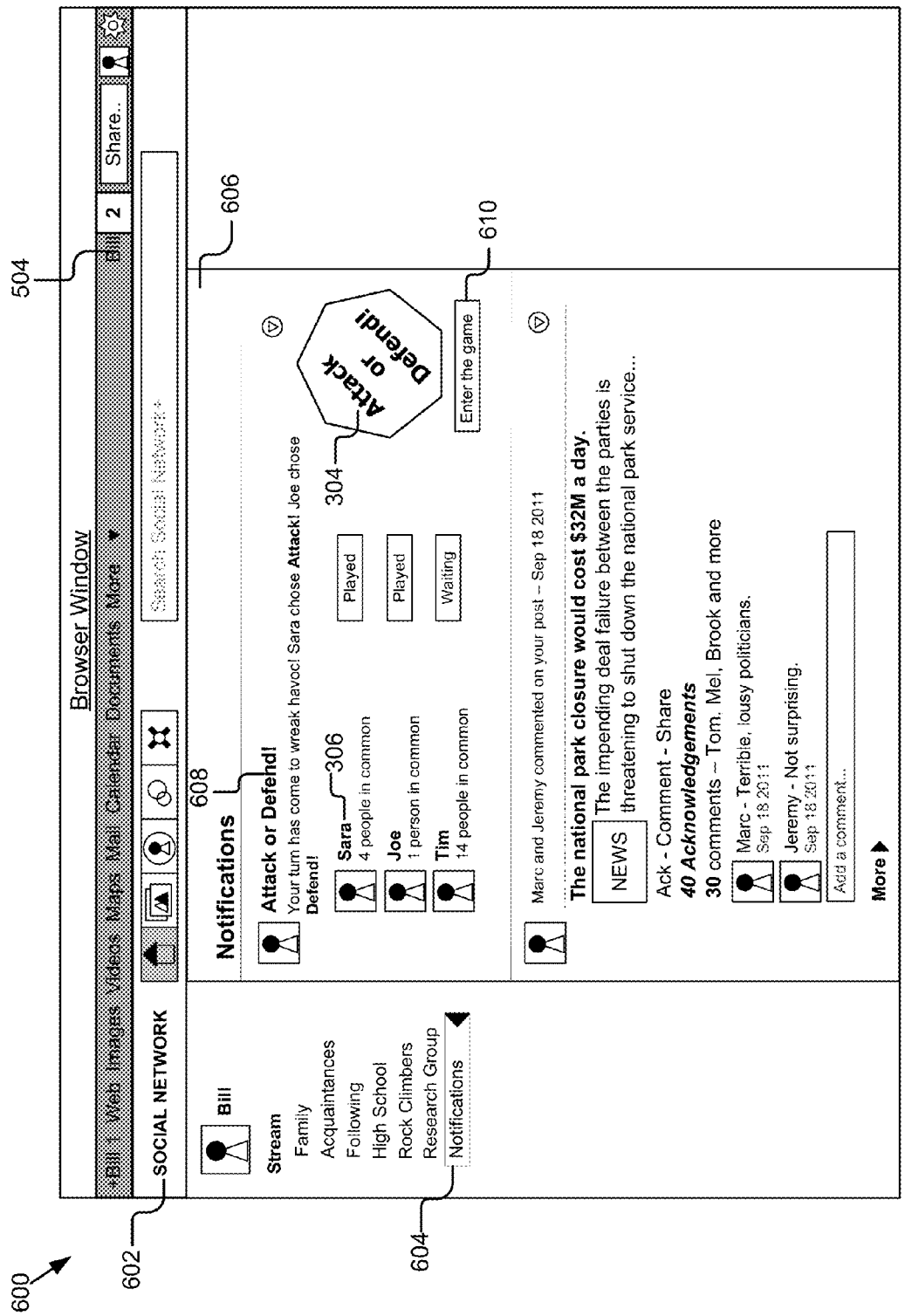
FIG. 6 is an example graphic representation of a user interface where a message from a sender is received through a profile stream on a social network.

FIG. 6 is an example of a graphic representation of a user interface 600 where a message from a sender is received through a profile stream on a social network. The user interface 600 displays the message from the user "Sara" 306 as a notification on a profile stream of the social network 602 of the user "Bill" 504. When the user "Bill" 504 clicks on the notification tab 604, the social network profile 602 refreshes to present a window 606 that displays the message 608 relating to the game 304 as a notification. The profile stream is another example of sending a message to a user through a queue channel. In one example, the user "Bill" 504 receives the message in the profile stream of the social network 602 because the user "Bill" 504 is a moderately active gamer. The message 608 includes a button "Enter the game" 610 which the user "Bill" 504 can click to enter the game and play his turn.

Figure 7:
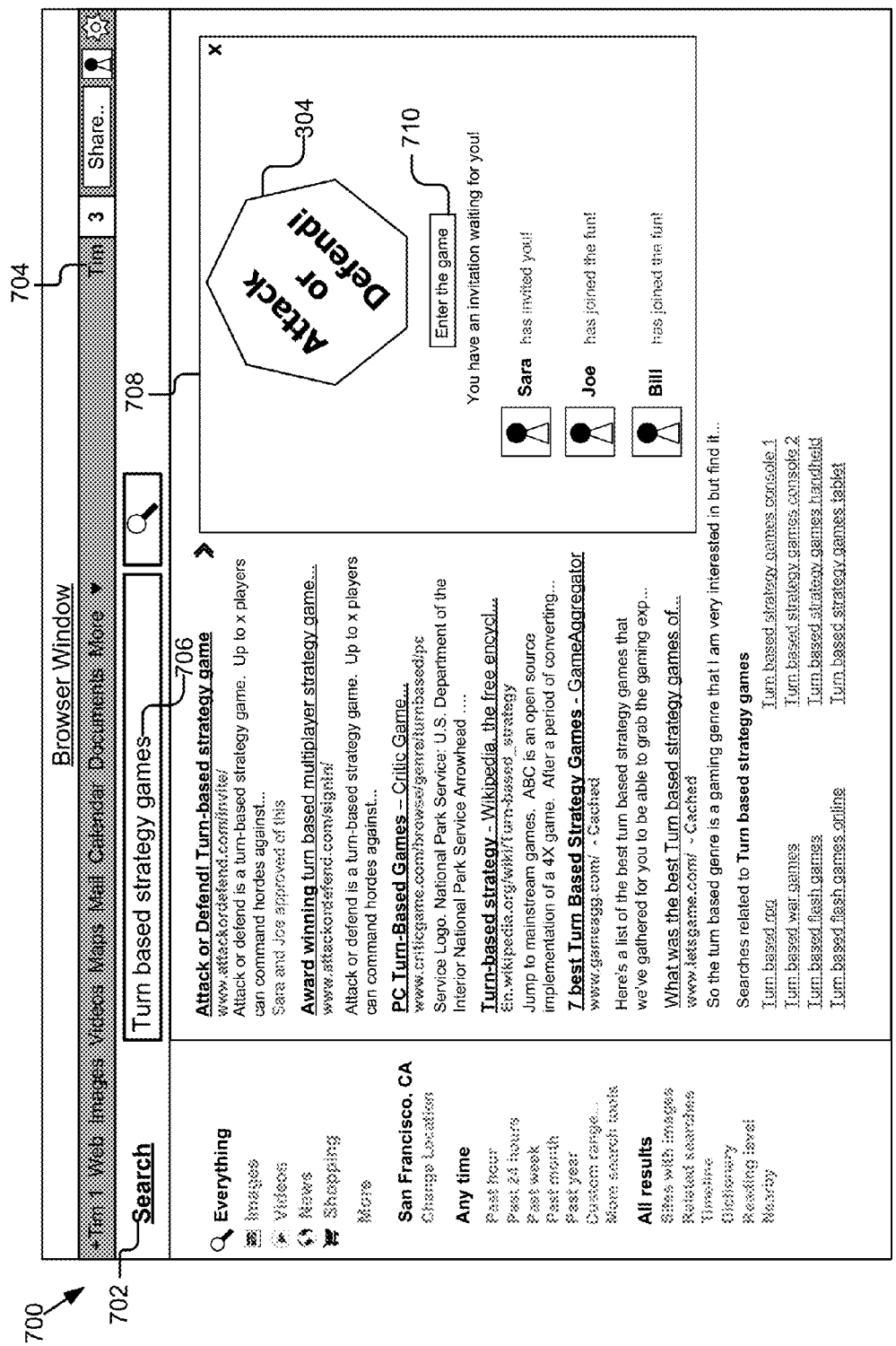
FIG. 7 is an example graphic representation of a user interface where a message from a sender is received on a search results web page.

FIG. 7 is an example of a graphic representation of a user interface 700 where a message from a sender is displayed on a search results web page. The user interface 700 displays a search results web page 702 of the user "Tim" 704 requesting a search on the topic of "Turn based strategy games" 706. The search results web page 702 displays a pop up window that includes an invitation 708 to the game 304. The search results web page 702 displaying the invitation 708 is an example of sending a message through a pull channel. In one example, the user "Tim" 704 receives the invitation 708 to the game 304 as a pop-up message because the user "Tim" is an inactive gamer and his real-time context indicates that he is searching for a turn based strategy games. The invitation 708 includes a button "Enter the game" 710 that the user "Tim" 704 can click to enter the game 304 and begin playing.

Figure 8:
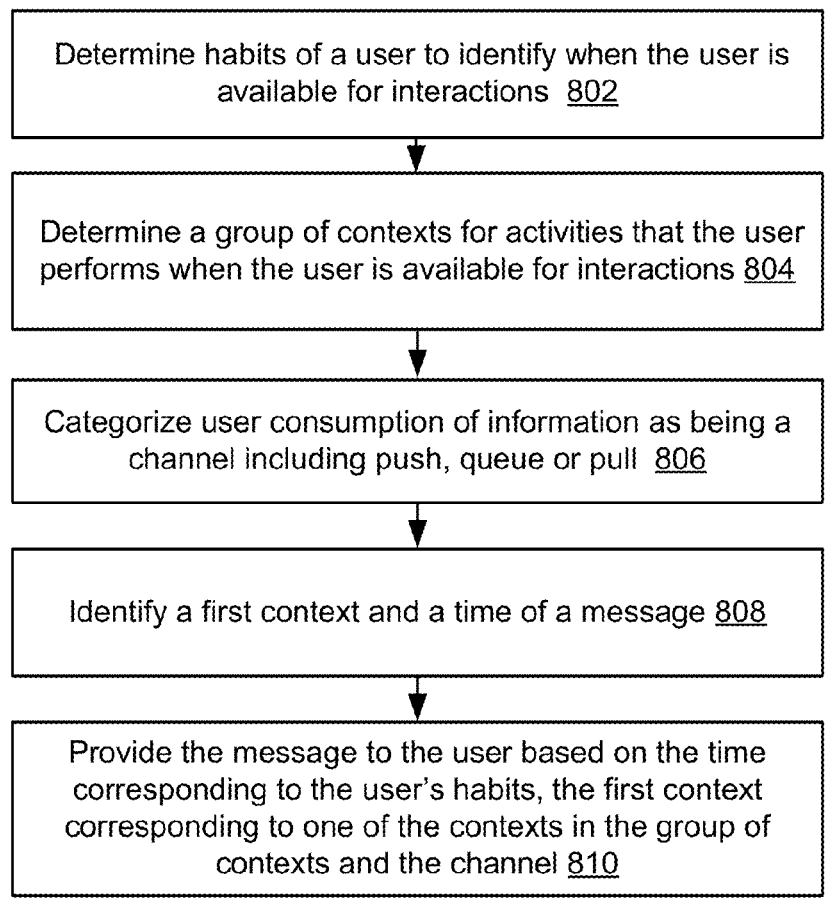
FIG. 8 is a flow diagram of an example of a method for delivering a message to a user on a channel.

FIG. 8 is a flow diagram 800 of an example of a method for delivering a message to a user on a channel. The channel application 103 includes a habit engine 206, a context engine 208 and a channel suggestion module 210. The habit engine 206 determines 802 habits of a user to identify when the user is available for interactions. For example, the user habitually checks new messages from friends in the electronic mail inbox towards the end of the day at 6 PM in his or her home. In another example, the user habitually logs into his or her social network profile to see new streams including messages from friends after 9 PM in his or her home. In a different example, the user habitually checks new text messages from friends received on the mobile device within a short window of time ranging from one minute to 30 minutes while at work.

The context engine 208 determines 804 a group of contexts for activities that the user performs when the user is available for interactions. For example, a first context relating to an activity that interests the user is eating or trying a certain type of dish, such as steak, sushi, etc. In another example, a second context relating to an activity that interests the user is participating in extreme sports, such as sky diving, skiing, mountain biking, etc. with one or more friends. In yet another example, a third context relating to an activity that the user enjoys is gaming on the social network, such as, turn-based multi-player online games, etc. with one or more friends.

The habit engine 206 categorizes 806 user consumption of information as being a channel including push, queue or pull. An example of a push or interrupt channel of information consumption is text messaging on the mobile device and obtaining information through text messaging. An example of a queue channel of information consumption is electronic mail and obtaining information through electronic mail. Another example of a queue channel of user consumption is a profile stream on a social network and obtaining information through the profile stream. An example of a pull channel of information consumption is through a search results web page when the user seeks out a particular piece of information by searching for it.

The channel suggestion module 210 identifies 808 a first context and a time of a message. For example, a sender sends a message from a turn-based multi-player online game to one or more users on the social network and challenging them to counter his or her move in the online game. The channel suggestion module 210 identifies a context relating to playing online games with friends. The channel suggestion module 210 provides 810 the message to the user based on the time corresponding to the user's habits, the first context corresponding to one of the contexts in the group of contexts and the channel. For example, if the message is a game invitation then it matches a context relating to playing online games associated with the user. The channel suggestion module 210 delivers the game invitation through text messaging (i.e., the push channel) to the user.

Figure 9:
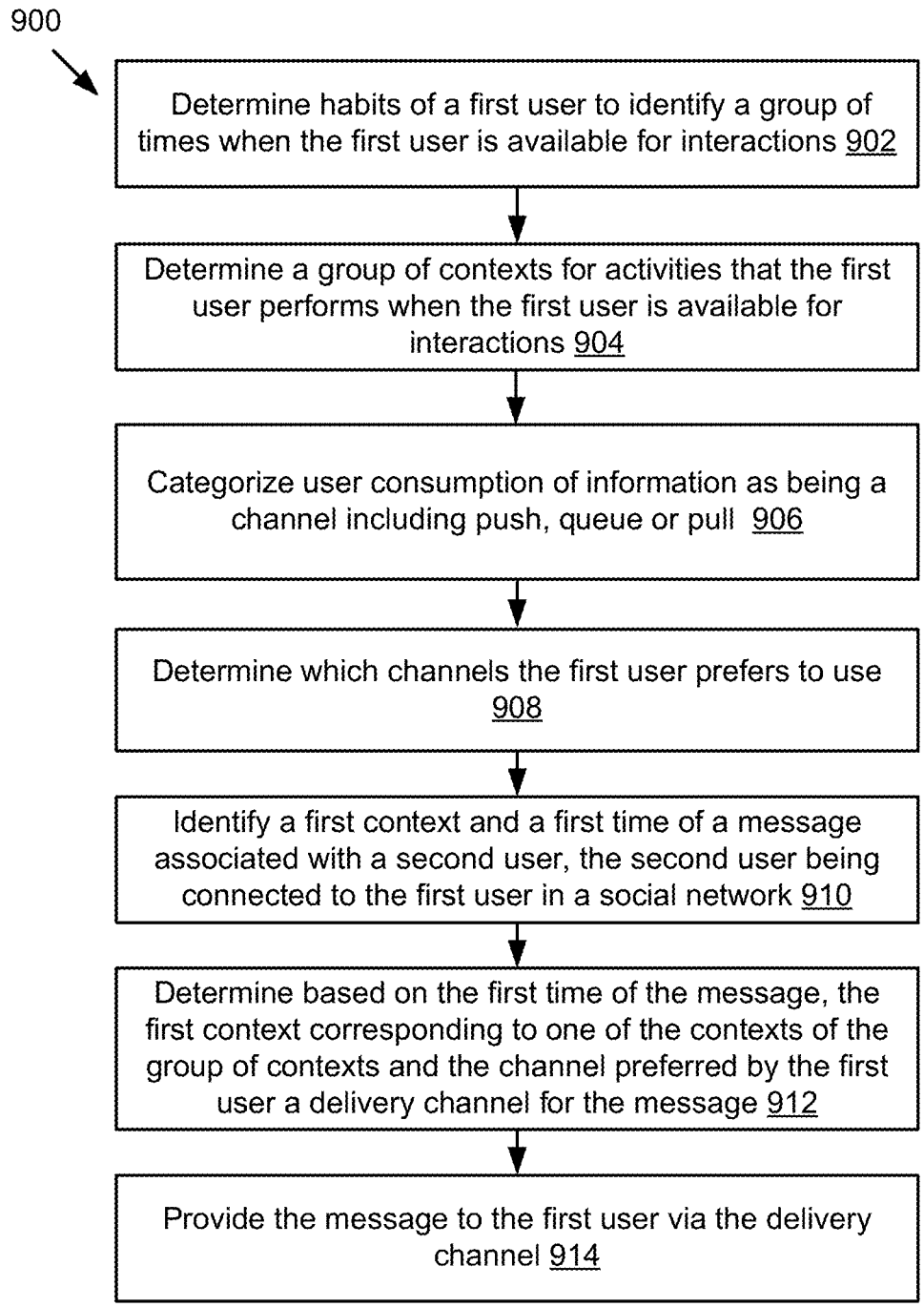
FIG. 9 is a flow diagram of another example of a method for delivering a message to a user on a channel.

FIG. 9 is a flow diagram 900 of another example of a method for delivering a message to a user on a channel. The channel application 103 includes a habit engine 206, a context engine 208 and a channel suggestion module 210. The habit engine 206 determines 902 habits of a first user to identify a group of times when the first user is available for interactions. For example, the habit engine 206 identifies that the first user is habitually at home after 7 PM based on the internet protocol address of the user device 115 and online browsing activity indicating leisurely browsing of social networks, microblogs, discussion forums, etc.

The context engine 208 determines 904 a group of contexts for activities that the first user performs when the first user is available for interactions. An example of group of contexts determined for the first user could include: playing contact sports, watching movies, discussing books, tracking trends in fashion, learning new fitness routines, etc.

The habit engine 206 categorizes 906 user consumption of information as being a channel including push, queue or pull and determines 908 which channels the first user prefers to use. For example, the habit engine 206 determines that a first user is responsive to a push channel method of information exchange and so the first user's preference is text messaging. In another example, the habit engine 206 determines that the first user is not responsive, preferring to use a queue channel of information exchange and so the first user's preference is electronic mail or a profile stream on a social network. In a third example, the habit engine 206 determines that the first user is passive, preferring to pull information when needed and so the first user's preference is through a search results page.

The channel suggestion module 210 identifies 910 a first context and a first time of a message associated with a second user, the second user being connected to the first user in a social network. In one example, the second user sends a message reviewing a steak house at Palo Alto and rating their beef steak to the first user on the social network. The channel suggestion module 210 identifies a context relating to liking and eating steaks associated with the review.

The channel suggestion module 210 determines 912 based on the first time of the message, the first context corresponding to one of the contexts of the group of contexts and the channel preferred by the first user a delivery channel for the message. For example, the message including a review of a steakhouse matches a context relating to liking steaks associated with the review. The channel suggestion module 210 provides 914 the message to the first user via the delivery channel. For example, the channel suggestion module 210 identifies that the review matches a context relating to liking steaks for the first user. The real time context of the first user indicates that the first user is currently at work. In one example, the channel suggestion module 210 delivers the review through electronic mail (i.e., the queue channel) to the first user. In another example, the channel suggestion module 210 delivers the review through the profile stream (i.e., the queue channel) of the first user on the social network.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "some embodiments" or "an instance" means that a particular feature, structure, or characteristic described in connection with the embodiment is included in at least some embodiment of the description. The appearances of the phrase "in some embodiments" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining, with one or more processors, a habitual activity of a first user;
   determining, with the one or more processors, a first context of the habitual activity;
   identifying, with the one or more processors, a time period when the first user is available for an interaction based on the habitual activity and the first context of the habitual activity;
   categorizing consumption of information by the first user as being on a type of communication channel, the type of communication channel including a push-based communication channel, a queue-based communication channel and a pull-based communication channel;
   determining, with the one or more processors, which type of communication channel the first user prefers to use;
   identifying a second context of a message from a second user, the second user being connected to the first user in a social network;
   determining whether the second context of the message corresponds to the first context of the habitual activity;
   determining a communication channel suitable for delivery of the message based on the type of communication channel preferred by the first user and the second context of the message corresponding to the first context of the habitual activity; and
   providing the message to the first user via the communication channel and in the time period when the first user is available for the interaction.

2. A computer-implemented method comprising:
   determining, with one or more processors, a habitual activity of a first user;
   determining, with the one or more processors, a first context of the habitual activity;
   identifying, with the one or more processors, a time period when the first user is available for an interaction based on the habitual activity and the first context of the habitual activity;
   categorizing, with the one or more processors, consumption of information by the first user as being on a type of communication channel, the type of communication channel including a push-based communication channel, a queue-based communication channel and a pull-based communication channel;
   identifying a second context of a message;
   determining whether the second context of the message corresponds to the first context of the habitual activity; and
   providing the message to the first user on a communication channel suitable for delivery of the message and in the time period when the first user is available for the interaction based on the second context of the message corresponding to the first context of the habitual activity.

3. The method of claim 2, wherein the push-based communication channel is the type of communication channel that comprises handling notifications from an application that alerts a user device associated with the first user.

4. The method of claim 2, wherein the queue-based communication channel is the type of communication channel that comprises handling notifications from an application that creates a list of notifications for the first user to review when the first user accesses the application.

5. The method of claim 2, wherein the pull-based communication channel is the type of communication channel that handles notifying the first user about the message responsive to the first user requesting information with the second context.

6. The method of claim 5, further comprising:
   receiving a search query from the first user that includes search terms corresponding to the second context;
   generating search results including the message; and
   providing the search results including the message to the first user.

7. The method of claim 2, wherein a second user is connected to the first user in a social network and the message includes a request from the second user for the first user to join the second user in performing one of the activities.

8. The method of claim 2, wherein a second user is connected to the first user in a social network and the message includes information about one of the activities performed by the second user.

9. The method of claim 2, further comprising:
   determining which type of communication channel that the first user prefers to use; and
   wherein providing the message to the first user is based on which type of communication channel that the first user prefers to use.

10. The method of claim 9, further comprising:
    responsive to providing the message to the first user, receiving feedback from the first user that the first user dislikes receiving notifications from one of the types of communication channels; and
    modifying settings based on the feedback.

11. The method of claim 2, wherein determining the habitual activity of the first user is based on determining a location of the user device associated with the first user.

12. The method of claim 2, further comprising determining a real-time context of the first user and providing the message to the first user based on the real-time context.

13. The method of claim 2, wherein the first user is connected to a second user in a social network and the message is from the second user.

14. A system comprising:
    one or more processors; and
    a memory, the memory storing instructions, which when executed cause one or more processors to:
    determine a habitual activity of a first user;
    determine a first context of the habitual activity;
    identify a time period when the first user is available for an interaction based on the habitual activity and the first context of the habitual activity;
    categorize consumption of information by the first user as being on a type of communication channel, the type of communication channel including a push-based communication channel, a queue-based communication channel and a pull-based communication channel;
    identify a second context of a message;
    determine whether the second context of the message corresponds to the first context of the habitual activity; and
    provide the message to the first user on a communication channel suitable for delivery of the message and in the time period when the first user is available for the interaction based on the second context of the message corresponding to the first context of the habitual activity.

15. The system of claim 14, wherein the pull-based communication channel is the type of communication channel that handles notifying the first user about the message responsive to the first user requesting information with the second context.

16. The system of claim 15, wherein the instructions further cause the one or more processors to:
   receive a search query from the first user that includes search terms corresponding to the second context;
   generate search results including the message; and
   provide the search results including the message to the first user.

17. The system of claim 14, wherein the instructions further cause the one or more processors to:
   determine which type of communication channel that the first user prefers to use; and
   wherein providing the message to the first user is based on which type of communication channel that the first user prefers to use.

18. The system of claim 17, wherein the instructions further cause the one or more processors to:
   responsive to providing the message to the first user, receive feedback from the first user that the first user dislikes receiving notifications from one of the types of communication channels; and
   modify settings based on the feedback.

19. The system of claim 14, wherein the habitual activity of the first user is determined based on the location of the user device associated with the first user.

20. The system of claim 14, wherein the instructions further cause the one or more processors to determine a real-time context of the first user and providing the message to the first user based on the real-time context.

* * * * *